United States Patent
Boyes et al.

(10) Patent No.: US 6,739,032 B2
(45) Date of Patent: May 25, 2004

(54) METHOD TO CREATE A HOT MELT FORM FOR USE WITH AN AIR INDUCTION ASSEMBLY

(75) Inventors: Gordon R. Boyes, Tilbury (CA); Robert John Lidster, Chatham (CA); Roderic Cole, Chatham (CA)

(73) Assignee: Siemens VDO Automotive Inc., Auburn Hills, MI (US)

( * ) Notice: Subject to any disclaimer, the term of this patent is extended or adjusted under 35 U.S.C. 154(b) by 101 days.

(21) Appl. No.: 09/974,690

(22) Filed: Oct. 9, 2001

(65) Prior Publication Data

US 2002/0024164 A1 Feb. 28, 2002

Related U.S. Application Data

(62) Division of application No. 09/686,252, filed on Oct. 11, 2000, now abandoned.
(60) Provisional application No. 60/159,850, filed on Oct. 15, 1999.

(51) Int. Cl.⁷ .................................. B23P 25/00
(52) U.S. Cl. .................. 29/458; 29/527.2; 264/46.4
(58) Field of Search ................. 29/888.3, 458, 29/460, 527.2; 277/314, 316, 617, 608; 264/46.4, 46.5, 46.6, 46.9, 50, 259, 260, 262; 285/335, 347; 296/208

(56) References Cited

U.S. PATENT DOCUMENTS

| | | | |
|---|---|---|---|
| 3,553,749 A | 1/1971 | Majeske | |
| 3,925,947 A | 12/1975 | Meyers et al. | |
| 4,059,564 A * | 11/1977 | Coughlan et al. | 264/46.4 |
| 4,989,314 A * | 2/1991 | De Waal | 264/46.6 |
| 4,995,545 A * | 2/1991 | Wycech | 264/46.6 |
| 5,108,524 A * | 4/1992 | Balderrama | 264/46.5 |
| 5,139,715 A * | 8/1992 | Katsuno et al. | 264/46.4 |
| 5,324,470 A * | 6/1994 | Comert et al. | 264/259 |
| 5,382,397 A | 1/1995 | Turner, Jr. | |
| 5,391,336 A * | 2/1995 | Akitomo et al. | 264/46.4 |
| 5,443,673 A * | 8/1995 | Fisher et al. | 264/259 |
| 5,480,597 A * | 1/1996 | Ishida et al. | 264/50 |
| 5,560,706 A * | 10/1996 | Yamazaki et al. | 264/46.5 |
| 5,607,629 A | 3/1997 | DeMello et al. | |
| 5,730,446 A | 3/1998 | Taylor et al. | |
| 6,241,936 B1 * | 6/2001 | Shimada et al. | 264/46.4 |
| 6,420,649 B1 * | 7/2002 | Kahl et al. | 277/316 |

FOREIGN PATENT DOCUMENTS

JP 63209814 8/1988

OTHER PUBLICATIONS

International Search Report dated Feb. 15, 2001.

* cited by examiner

Primary Examiner—David P. Bryant

(57) ABSTRACT

A method for creating a hot melt foamed form for an air induction system. A block of thermal mastic elastomer is melted and blended with nitrogen gas to create a foamed material. The foamed material is applied by robotic techniques over a base material on the surface of a polypropylene glass lower shell. After the foamed material cures, a polypropylene glass cover is applied over the foamed material form to create an air tight dust/water seal. The cover does not adhere to the cured foamed material and is removable when service is necessary. The foam material can also be dispensed into a mold and then transferred to the base, allowing for changes in the shape and profile of the foamed material. This method can also be employed to create an isolation pad on an air induction system to absorb engine shock. The thermal mastic elastomer can also be employed to create a seal between the cover neck of an air induction assembly and a mass air flow sensor.

16 Claims, 3 Drawing Sheets

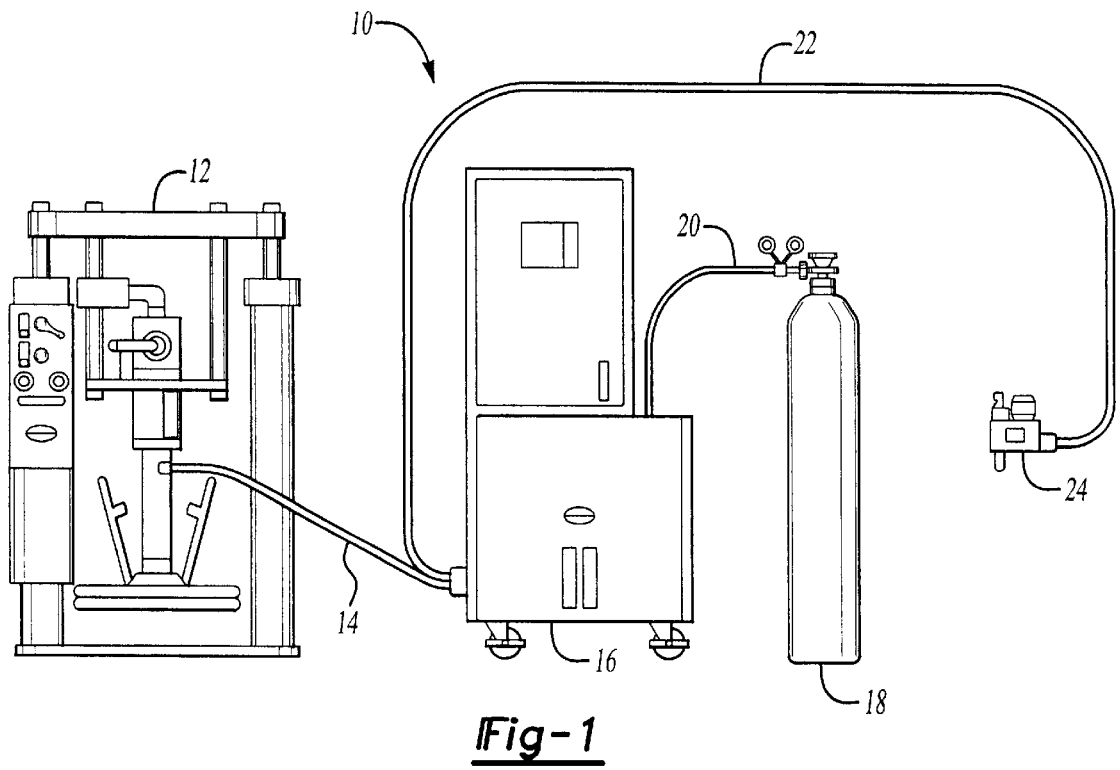
Fig-1
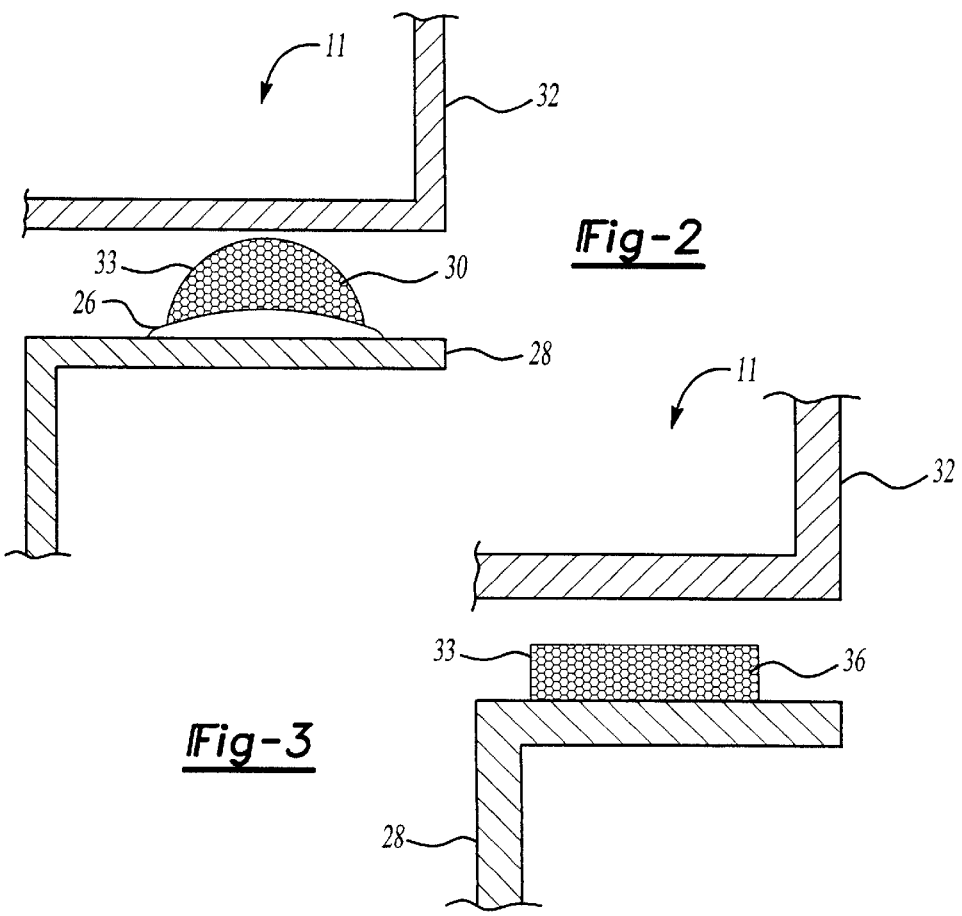
Fig-2
Fig-3

METHOD TO CREATE A HOT MELT FORM FOR USE WITH AN AIR INDUCTION ASSEMBLY

This application is a divisional application of Ser. No. 09/686,252 filed Oct. 11, 2000, now abandoned.

This application claims priority from provisional application serial No. 60/159,850, filed Oct. 15, 1999.

BACKGROUND OF THE INVENTION

The present invention relates generally to a method for creating a form from a hot melt elastomeric foamed material for use with an air induction assembly.

A gasket with a "peel and stick" surface is commonly utilized in sealing an air induction cleaner. The gasket is made of polyurethane foam material and is supported by a mylar film applied to the surface. An adhesive is also applied to adhere the gasket to the part. Wax paper is placed over the adhesive surface to prevent adhesion to any other surface before application of the gasket to the part. When the gasket is to be applied to the part, the operator peels the wax paper from the foam material gasket, exposing the adhesive surface. The gasket is then positioned and applied over the surface of the part, creating a seal.

There are many drawbacks to utilizing the prior art gasket. For one, because the gasket is manufactured, it is of a fixed design and there is no flexibility to design changes in the air induction assembly. Additionally, the gasket is a manufactured part typically made at another location.

Hence, there is a need in the art for a method for creating a form from a hot melt elastomeric foamed material for use with an air induction assembly and on the air induction assembly.

SUMMARY OF THE INVENTION

The present invention relates generally to a method for creating a form from a hot melt elastomeric foamed material for use with an air induction assembly.

A hot melt assembly is utilized for creating a gasket for an air induction system. A solid block of thermal mastic elastomeric material is melted and blended with nitrogen gas to create a foamed material. Preferably, a dispensing gun applies a layer of base material, and then a layer of foamed material, around the perimeter of a lower shell. After the foamed material is allowed to cure, a cover is applied thereover, creating an air tight dust/water seal, the cover being removable if service is necessary.

Alternatively, the foamed material can be mixed with the base material and dispensed into a mold, creating a form of desired shape. The molded form is then applied and bonded to the surface of the lower shell.

Both of the above mentioned methods can also be employed to form an isolation pad bumper positioned between the air induction assembly and a vehicle mounting point. The foamed material is attached to a bracket on a polypropylene 30% glass housing by either the above-mentioned foam-in-place method or the transfer molding method.

A seal can also be formed between the air cleaner lower shell and a mass air flow sensor of the air induction assembly. The hot melt material is dispensed into a mold positioned to surround the interior and exterior surface of the neck of the air cleaner lower shell. The lower shell with the attached melted material seal is removed from the mold, and a mass air flow sensor is inserted within the neck, the seal securing the sensor in place. Alternatively, the mass air flow sensor can be inserted within the neck first, and the hot melt material can be injected through an aperture in the neck, filling the space between the outer diameter of the sensor and the inner diameter of the neck to secure the sensor within.

Accordingly, the present invention provides a method for creating a form from a hot melt elastomeric foamed material for use with an air induction assembly.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 1 illustrates the hot melt assembly of the present invention.

FIG. 2 illustrates a side view of a hot melt foam-in-place form employed on a gasket on an air induction assembly.

FIG. 3 illustrates a side view of a hot melt transfer molding form employed on a gasket on an air induction assembly.

DETAILED DESCRIPTION OF THE PREFERRED EMBODIMENT

Figure 3B:
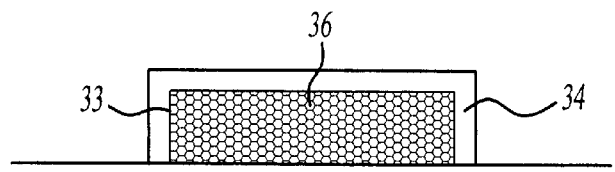
FIG. 3b illustrates a side view of a mold utilized to shape a hot melt form.

FIG. 1 illustrates a hot melt assembly 10 utilized to create a hot melt foam for use with an air induction system 11 (shown in FIG. 2). A solid block of thermal mastic elastomeric material is heated and melted to the liquid form in a melting pot 12. The melted material is then fed through a feeding tube 14 into a mixing unit 16. Nitrogen gas stored in a nitrogen tank 18 enters the mixing unit 16 by a tank connector tube 20 and is blended with the hot melt material to create a foamed material 30 (shown in FIG. 2). The added nitrogen gas expands the melted material and changes the density. The amount of nitrogen added to the mixture is dependant on the required use.

After being thoroughly mixed, the foamed material 30 is fed through material lines 22 to a dual nozzle dispensing gun 24 attached to a robot. The robot and the gun 24 apply a layer of non-foamed base material 26 to the surface of a lower shell 28, as shown in FIG. 2. The base material 26 is a thermal mastic blend and acts as a bonding agent, attaching a foamed material 30 to the lower shell 28. Nitrogen gas is not mixed with the base material 26 as the nitrogen gas will cause shrinkage (about 17%) during curing. After the application of the base material 26 to the surface of the lower shell 28, the foamed material 30 is applied by the gun 24 directly over the base material 26.

After the foamed material 30 is allowed to cure, an air cleaner cover 32 is applied over the cured foamed material 30 creating an air tight dust/water gasket 33. As the foam material 30 is cured and hardens, the air cleaner cover 32 does not adhere to the foamed material 30 and is removable when service is necessary.

Alternatively, as shown in FIG. 3, the foamed material 30 and the base material 26 can be combined to form a mixed material 36. The mixed material 36 is dispensed by injection into a hollow mold 34 by a tool to create a form of desired shape. By using a mold 34, the profile and the shape of the gasket 33 can be controlled. The mold 34 is shown schematically in FIG. 3b. The molded mixed material 36 is transferred to the lower shell 28 and bonds thereto by means of the blended base material. The mold 34 is then removed, leaving the gasket 33 attached to the lower shell 28.

Figure 4:
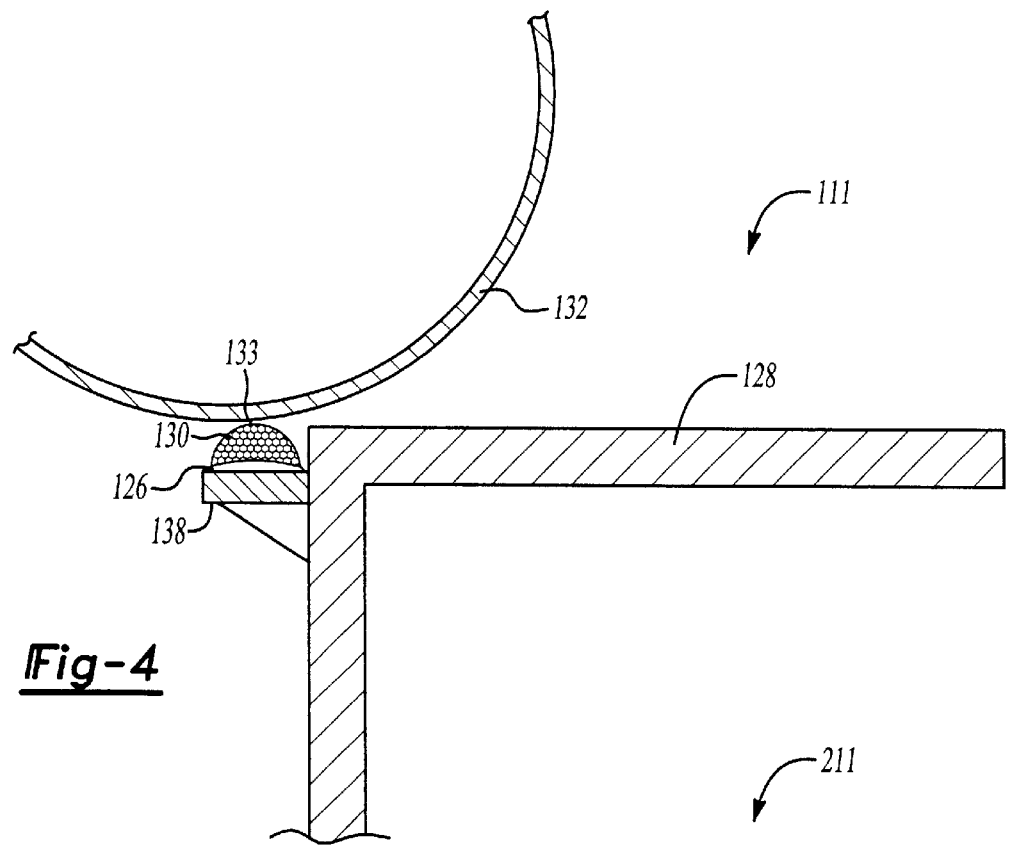
FIG. 4 illustrates a side view of a hot melt foam isolation pad employed on an air induction assembly.

The above-mentioned foam-in-place and the transfer molding methods can also be employed in forming an isolation pad for use with the air induction assembly 111, as shown in FIG. 4. After application of the base material 126 to a bracket 138 positioned on a housing 128, the foamed material 130 is applied to create an isolation pad 133. The isolation pad 133 absorbs shock from the engine during high torque conditions and prevents contact between the bracket 138 and the vehicle mounting point 132. Additionally, the foamed material 130 and the base material 126 can be combined to form a molded mixture which is dispensed into a mold to create an isolation pad 133. The molded mixture is transferred to the bracket 138 and bonds thereto, removing the isolation pad 133 from the mold. The parts are preferably made of polypropylene 30% glass material.

Figure 5:
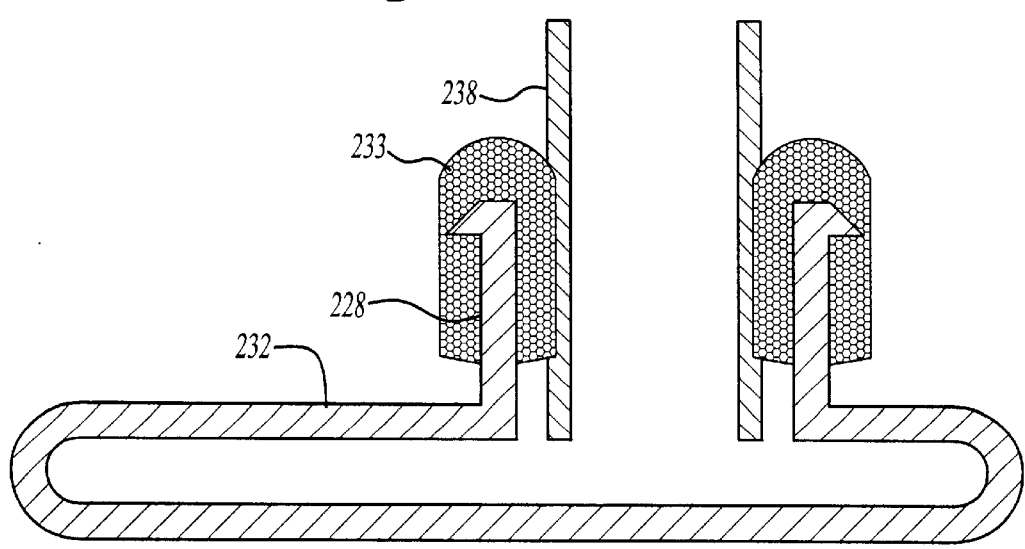
FIG. 5 illustrates a side cross sectional view of a hot melt mold-in-place seal used to seal a mass air flow sensor housing.
Figure 5B:
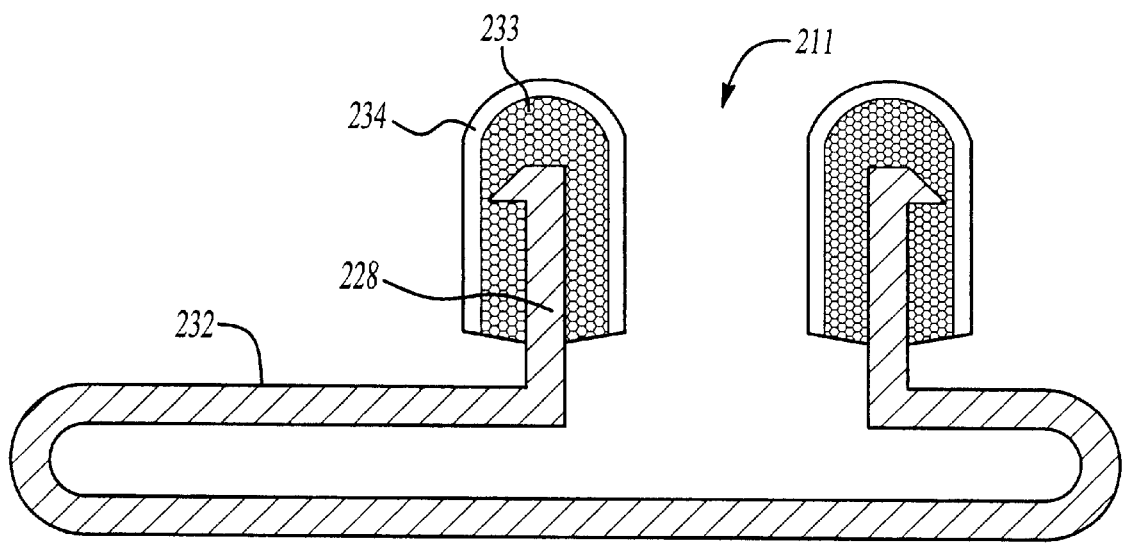
FIG. 5b illustrates a side cross sectional view of a mold utilized to shape a hot melt mold-in-place seal.

As illustrated in FIG. 5, a mold-in-place seal 233 can also be employed on an air induction assembly 211 between the neck 228 of an air cleaner lower shell 232 and the mass air flow sensor 238. The melted thermal mastic elastomeric material is dispensed into a mold 234, shown in FIG. 5b, surrounding the inner diameter and outer diameter of the neck 228 of an air cleaner lower shell 232, bonding thereto. After bonding, the lower shell 232 is removed from the mold 234, creating a seal 233.

Figure 6:
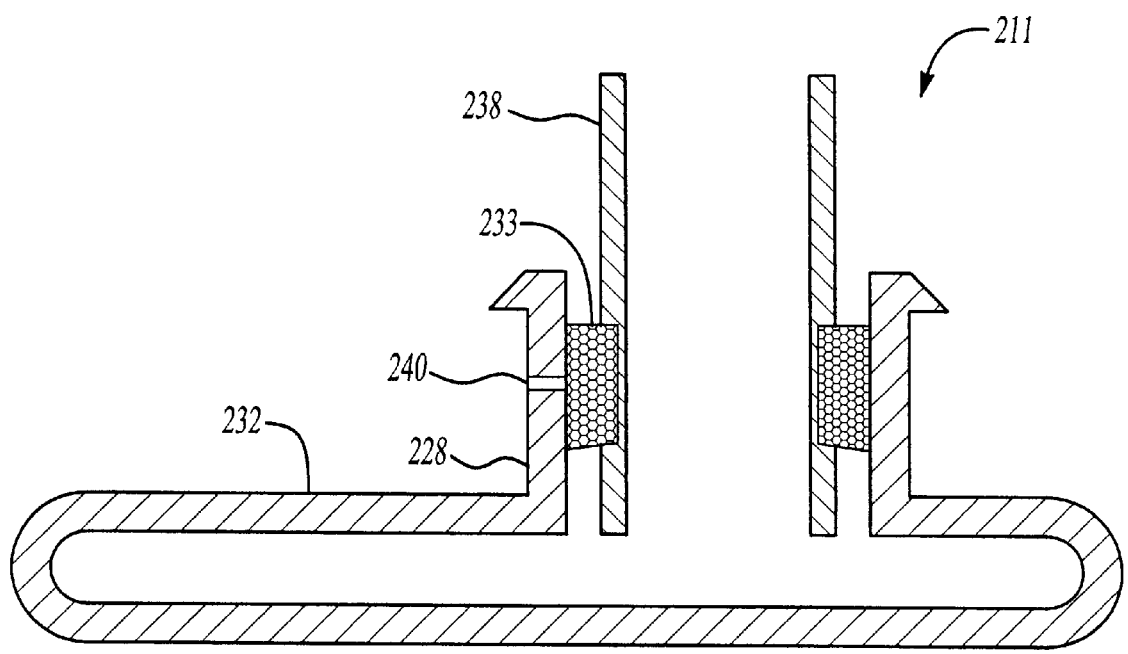
FIG. 6 illustrates a side cross sectional view of an alternative embodiment of a hot melt mold-in-place seal used to seal a mass air flow sensor housing.

FIG. 6 illustrates another method of securing the mass air flow sensor 238 within the air cleaner lower shell neck 228, the neck 228 further including an aperture 240. The mass air flow sensor 238 having an outer diameter smaller than the inner diameter of the lower shell neck 228 is positioned within the neck 228. The hot melt material is dispensed through the aperture 240 in the neck 228, flowing around the inner diameter of the neck 228 and the outer diameter of the mass air flow sensor 238, creating a seal 233 securing the sensor 238 within.

There are several advantages to utilizing a hot melt foam-in-place form. For one, the process for manufacturing the hot melt form is more cost efficient, reducing material and waste. Additionally, there is an increase in flexibility in the manufacturing capabilities because the form can be dispensed on most configurations and is adaptable to future design changes. Finally, there are quality improvements. As the form is applied to directly to the surface of the part, the problem of misalignment of the form to the part is eliminated, increasing accuracy and reliability.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for forming an elastomeric pad comprising the steps of:

melting a thermal mastic elastomeric material to a liquid form;

applying said liquid form to a surface of an air induction assembly to create said elastomeric pad; and applying a non-foamed base material to said surface of said air induction assembly prior to the step of applying said liquid form.

2. The method as recited in claim 1 wherein said surface is a bracket of said air induction assembly.

3. A method for forming an elastomeric pad comprising the steps of:

melting a thermal mastic elastomeric material to a liquid form;

applying said liquid form to a bracket of said an air induction assembly to create said elastomeric pad; and utilizing said elastomeric pad to prevent contact between said bracket and a vehicle mounting point.

4. The method as recited in claim 3 further comprising the step of blending a gas into said liquid form to form a foamed composition.

5. The method as recited in claim 4 wherein said gas is nitrogen.

6. The method as recited in claim 3 further comprising the step of curing said elastomeric pad.

7. A method for forming an elastomeric pad comprising the steps of:

melting a thermal mastic elastomeric material to a liquid form;

applying said liquid form to a surface of an air induction assembly to create said elastomeric pad; an mixing a non-foamed base material with said liquid form prior to the step of applying said liquid form to said surface.

8. A method for forming an elastomeric pad comprising the steps of:

melting a thermal mastic elastomeric material to a liquid form;

blending a gas into said liquid form to form a foamed composition;

applying a non-foamed base material to a bracket of said air induction assembly;

applying said foamed composition to said bracket of an air induction assembly to create said elastomeric pad; and curing said elastomeric pad.

9. The method as recited in claim 8 wherein said gas is nitrogen.

10. The method as recited in claim 8 further including the step of utilizing said elastomeric pad to prevent contact between said bracket and a vehicle mounting point.

11. The method as recited in claim 8 wherein said non-foamed base material is a thermal mastic blend material.

12. A method for forming an elastomeric pad comprising the steps of:

melting a thermal mastic elastomeric material to a liquid form;

blending a gas into said liquid form to form a foamed composition;

mixing a non-foamed base material with said foamed composition;

applying said foamed composition with said non-foamed base material to a bracket of an air induction assembly to create said elastomeric pad; and curing said elastomeric pad.

13. The method as recited in claim 12 wherein said gas is nitrogen.

14. The method as recited in claim 12 further including the step of preventing contact between said bracket and a vehicle mounting point.

15. The method as recited in claim 12 wherein said non-foamed base material is a thermal mastic blend material.

16. The method as recited in claim 12 further comprising the steps of dispensing said foamed composition into a mold and removing said foamed composition from said mold.

* * * * *